United States Patent
Mashima et al.

(10) Patent No.: US 8,786,988 B2
(45) Date of Patent: Jul. 22, 2014

(54) READ SENSOR HAVING A STRUCTURE FOR REDUCING MAGNETIC COUPLING BETWEEN A MAGNETIC BIAS LAYER AND AN UPPER MAGNETIC SHIELD

(75) Inventors: Hideki Mashima, Kanagawa (JP); Nobuo Yoshida, Kanagawa (JP); Takahiro Ibusuki, Tokyo (JP); Tsutomu Yasuda, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/472,326

(22) Filed: May 15, 2012

(65) Prior Publication Data
US 2013/0308228 A1 Nov. 21, 2013

(51) Int. Cl.
*G11B 5/39* (2006.01)

(52) U.S. Cl.
USPC ...................... 360/324.12; 360/319

(58) Field of Classification Search
USPC .......... 360/319, 324.1, 324.11, 324.12, 324.2
See application file for complete search history.

(56) References Cited

U.S. PATENT DOCUMENTS

| | | | |
|---|---|---|---|
| 6,493,194 B1 | 12/2002 | Sakaguchi et al. | |
| 7,502,209 B2 | 3/2009 | Freitag et al. | |
| 7,804,668 B2* | 9/2010 | Zhou et al. | 360/324.12 |
| 8,203,809 B2* | 6/2012 | Zhou et al. | 360/324.12 |
| 8,451,565 B1* | 5/2013 | Okamura et al. | 360/313 |
| 2005/0002131 A1* | 1/2005 | Gill | 360/324.12 |
| 2005/0275975 A1* | 12/2005 | Zhang et al. | 360/324.12 |
| 2007/0253123 A1* | 11/2007 | Freitag et al. | 360/324.12 |
| 2009/0154032 A1 | 6/2009 | Freitag | |
| 2010/0195253 A1* | 8/2010 | Freitag et al. | 360/324.12 |

FOREIGN PATENT DOCUMENTS

| JP | 2010-092549 | 4/2010 |
|---|---|---|
| JP | 2010-152941 | 7/2010 |

* cited by examiner

*Primary Examiner* — Jefferson Evans
(74) *Attorney, Agent, or Firm* — Zilka-Kotab, PC

(57) ABSTRACT

A magnetic sensor having reduced read gap thickness, reduced signal noise and improved signal to noise ratio. The sensor includes a sensor stack and hard bias structures formed at either side of the sensor stack for biasing the free layer of the sensor. A protective layer is formed over a portion of the hard bias structure, however a portion of the hard bias structure extends upward toward the upper shield and is disposed between the protective layer and the sensor stack as a result of the process used to form the magnetic bias structure. This portion of the hard bias structure that extends toward the upper shield has a reduced magnetization relative to the rest of the hard bias structure so that it will not magnetically couple with the upper shield.

14 Claims, 32 Drawing Sheets

READ SENSOR HAVING A STRUCTURE FOR REDUCING MAGNETIC COUPLING BETWEEN A MAGNETIC BIAS LAYER AND AN UPPER MAGNETIC SHIELD

FIELD OF THE INVENTION

The present invention relates to magnetic data recording and more particularly to a current perpendicular to plane (CPP) magnetoresistive head having improved signal to noise ratio (SNR) at small trackwidths.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

As the track width is narrowed, the effect of noise (mag-noise) generated by thermal vibrations during magnetization of the free layer on the head signal-to-noise ratio (SNR) become prohibitively large. In the latest TMR heads the improvement in the MR ratio is remarkable, however the accompanying improvement in the head signal to noise ratio has been limited. Since the mag-noise increases proportionally as the playback output increases, the head SNR saturates at some maximum value. Thus, to improve the head SNR along with further miniaturization in the future, a reduction in this mag-noise is very important. Magnetic biasing (domain control) of the free layer is effective in reducing mag-noise.

In addition, the magnetic sensor is located between top and bottom shields, and the distance between these shields defines the gap length. In order to increase the data density by increasing the number of bits per inch of data track, it is necessary to reduce the gap thickness as much as possible. The magnetoresistive sensor must be thinned in order to reduce the bit length. Sensors have included a non-magnetic gap that separates the hard bias structure and sensor from the upper magnetic shield. This non-magnetic gap prevents magnetic coupling between the hard bias structure and the upper shield. Unfortunately in order for this gap layer effectively magnetically de-couple the hard bias structure from the upper shield, it must made thick, and this thickness increases the read gap (e.g. bit length). Therefore, there remains a need for a structure and method for producing such a structure that can maximize signal to noise ratio, while also minimizing the read gap for improved data density.

SUMMARY OF THE INVENTION

The present invention provides a magnetic sensor that includes: first and second, electrically conductive magnetic shields; a sensor stack sandwiched between the first and second magnetic shields, the sensor stack having first and second laterally opposed sides; first and second magnetic biasing layers extending laterally from the first and second sides of the sensor stack; and first and second non-magnetic protective layers each being located between the second electrically conductive shield and one of the first and second magnetic layers. The magnetic bias layer has a tail portion that extends toward the second shield and is disposed between the non-magnetic protective layer and the sensor stack, the tail portion being magnetically weakened relative to the rest of the magnetic hard bias layer.

The sensor can be constructed by a process whereby a sensor is formed, and a magnetic bias material is deposited over the sensor. A protective layer is then deposited over the magnetic bias layer, and a CMP process is performed, resulting a portion of the bias material extending upward between the protective layer and sensor and having an exposed surface. A process is then performed to demagnetize the portion of the magnetic bias material that extends upward between the protective layer and sensor. This demagnetization can include injecting a non-magnetic material into the portion of the magnetic bias material that extends upward between the protective layer and the sensor stack. This injection of a non-magnetic material can be performed by reactive ion etching in an atmosphere that contains a non-magnetic element or by ion injection.

During the demagnetization process the protective layer protects the rest of the hard bias layer from being demagnetized. After the demagnetization has been performed, an upper shield can be constructed. Because the upper extending portion of the magnetic bias material has been demagnetized, the magnetic bias structure does not magnetically couple with the upper shield. This prevents signal noise from being picked up from the shield and transmitted to the free layer bias structure (which in turn affects the free layer magnetization). This, therefore, advantageously decreases signal noise and increase the signal to noise ratio. In addition, this eliminates the need for relatively thick non-magnetic gap layer beneath the upper shield. Allowing this non magnetic gap layer (or allowing it to be much thinner) advantageously decreases the read gap thickness for improved data density.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
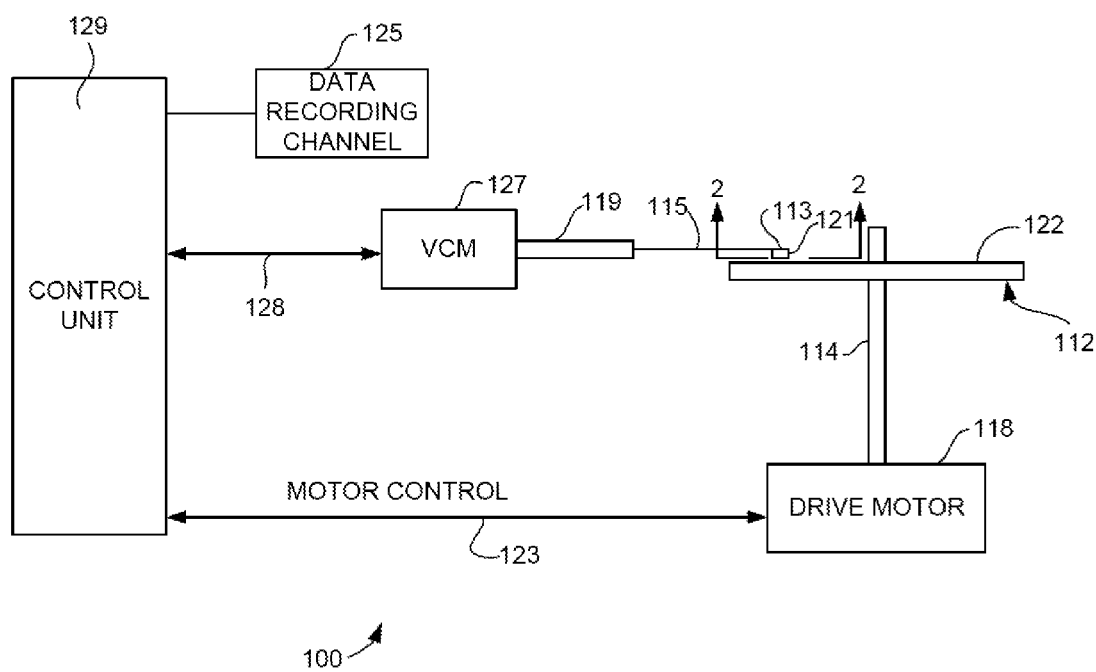
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
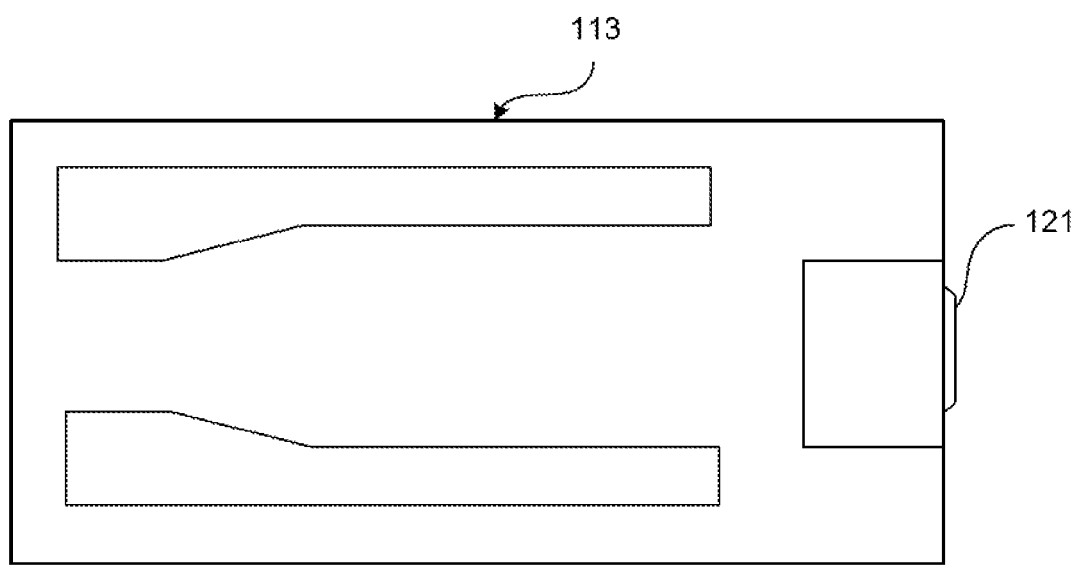
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
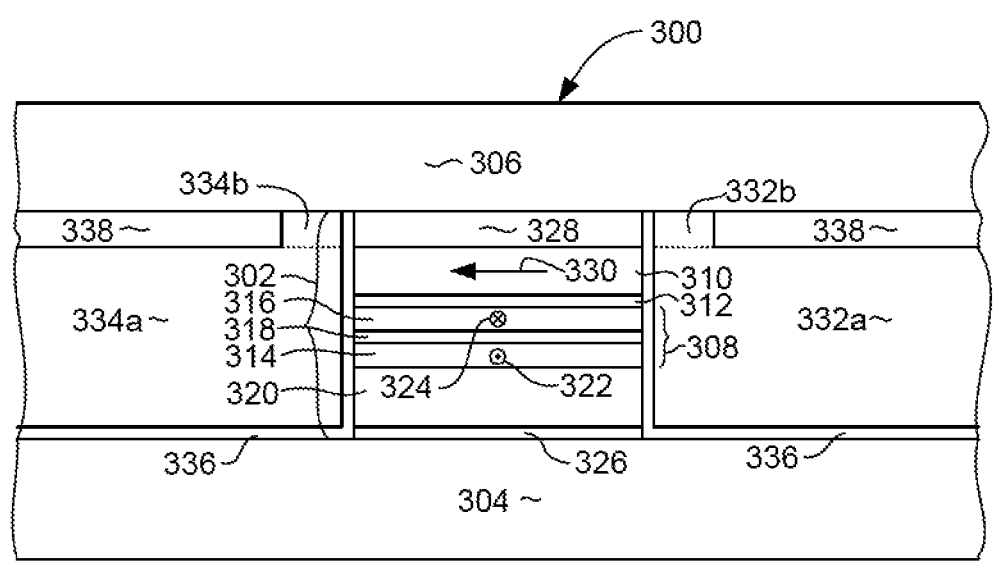
FIG. 3 is an enlarged ABS view of a magnetoresistive sensor according to an embodiment of the invention.

FIG. 3 shows a magnetic read head 300 having a sensor stack 302 that is sandwiched between first and second magnetic shields 304, 306. The magnetic shields 304, 306 can be constructed of an electrically conductive, magnetic material such as NiFe so that they can function as electrical leads for supplying a sense current to the sensor stack 302 as well as functioning as magnetic shields. The sensor stack can include a magnetic pinned layer structure 308, a magnetic free layer 310 and a non-magnetic barrier or spacer layer 312 sandwiched there-between. The sensor stack 302 can also include a seed layer 326 at its bottom, which can be provided to ensure a desired grain structure formation in the above deposited layers. The sensor stack 302 can also include a capping layer 328 at its top to protect the under-lying layers from damage during manufacture. The capping layer 328 can be, for example, Ru or Ru/Ta/Ru.

The pinned layer structure can include first and second magnetic layers 314, 316 that are anti-parallel coupled across a non-magnetic antiparallel coupling layer 318 such as Ru sandwiched there-between. The first magnetic layer 314 can be exchange coupled with a layer of antiferromagnetic material (AFM layer) 320, which can be constructed of a material such as IrMn or PtMn. This exchange coupling strongly pins the magnetization of first magnetic layer 310 in a first direction perpendicular to the ABS as indicated by arrowhead symbol 322. Anti-parallel coupling between the magnetic layers 314, 316 pins the magnetization of the second magnetic layer 316 in a second direction that is anti-parallel with the first direction and perpendicular to the ABS as indicated by arrow-tail symbol 324.

The free layer 310 has a magnetization that is biased in a direction that is generally parallel with the ABS as indicated by arrow 330. Although the magnetization 330 is biased in this direction, it is free to move in response to an external magnetic field, such as from a magnetic medium. The biasing of the magnetization 330 is achieved by a magnetic bias field from hard magnetic bias layers 332, 334, which can also be referred to as magnetic domain control layers 332, 334. These magnetic bias layers 332, 334 are permanent magnets formed of a high coercivity magnetic material such as CoPt, or CoPtCr. The bias layers 332, 334 are separated from the sensor stack 302 and from at least the bottom shield 304 by thin, non-magnetic, electrically insulating layers such as alumina 336, 338. In addition, hard bias protection layers 338 are provided at the top of the hard bias layers 332, 334, separating the hard bias layers 332,334 from the upper shield 306 and protecting the hard bias layers during manufacture as will be seen below. The hard bias protection layers 338 are constructed of a novel material, preferably Cr.

Figure 4:
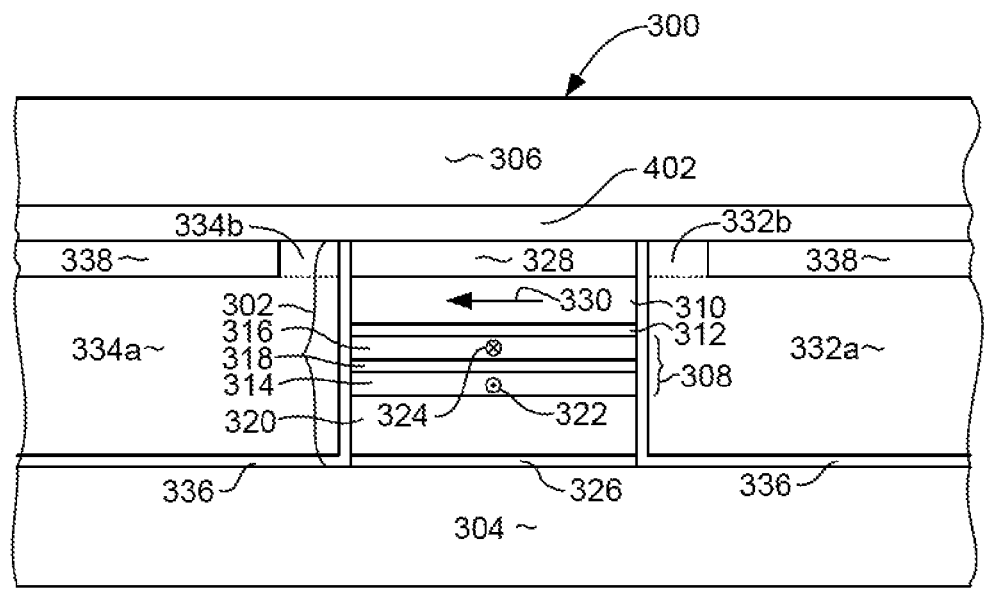
FIG. 4 is an enlarged ABS view of a magnetoresistive sensor according to an alternate embodiment of the invention.

As can be seen in FIG. 4, each of the hard bias layers 332, 334 has a main portion 332a, 334a, but also has an upward extending tail portion 332b, 334b. This tail portion 332b, 334b is a bi-product of a manufacturing process used to deposit the hard bias layers 332, 334. This manufacturing process will be described in greater detail herein below. In prior art magnetic read heads, this upward extending tail portion 332b, 334b had the undesirable effect of magnetically coupling the hard bias structures 332, 334 with the magnetic shield. This is because the tail portion 332b, 334b, being made of the same magnetic material as the main body portion 332a, 332b was itself magnetic. This magnetic coupling had the undesirable result of increasing magnetic noise and decreasing signal to noise ratio.

One way to magnetically decouple the hard bias layers 332, 334 from the shield 306 was to include a non-magnetic spacer (not shown in FIG. 3) directly beneath the shield 306, thereby separating the shield 306 from the sensor stack 302 and hard bias layers 332, 334. This however increases the read gap of the sensor, resulting in decreased data density. The present invention eliminates this undesirable coupling between the hard bias layers 332, 334 and the shield 306 without the need for the non-magnetic spacer described above. The present invention achieves this by making the hard bias tail portions 332, 334 non-magnetic. The tails 332b, 334b are still formed as a bi-product of deposition of the bias structures 332, 334. However the tail portions 332b, 334b have been demagnetized by a method that will be described below. This provides an inherent magnetic spacing between the shield 306 and the magnetic main portion 332a, 334a of the hard bias layers 332, 334.

With reference to FIG. 4, an optional non-magnetic, electrically conductive gap layer 402 can be provided immediately beneath the shield 406. This layer provides additional magnetic spacing between the hard bias layer 332 and the shield 306 in order to prevent magnetic coupling between the hard bias layer 332 and the shield 306. In this embodiment, the hard bias tail portions 332b, 334b are non-magnetic (e.g. demagnetized) as described above. However, additional magnetic spacing is provided by the presence of the non-magnetic layer 402. While this layer 402 does increase the read gap somewhat, it can be made much thinner than would be possible if the tail portions 332b, 334b were actually magnetic.

Figure 5:
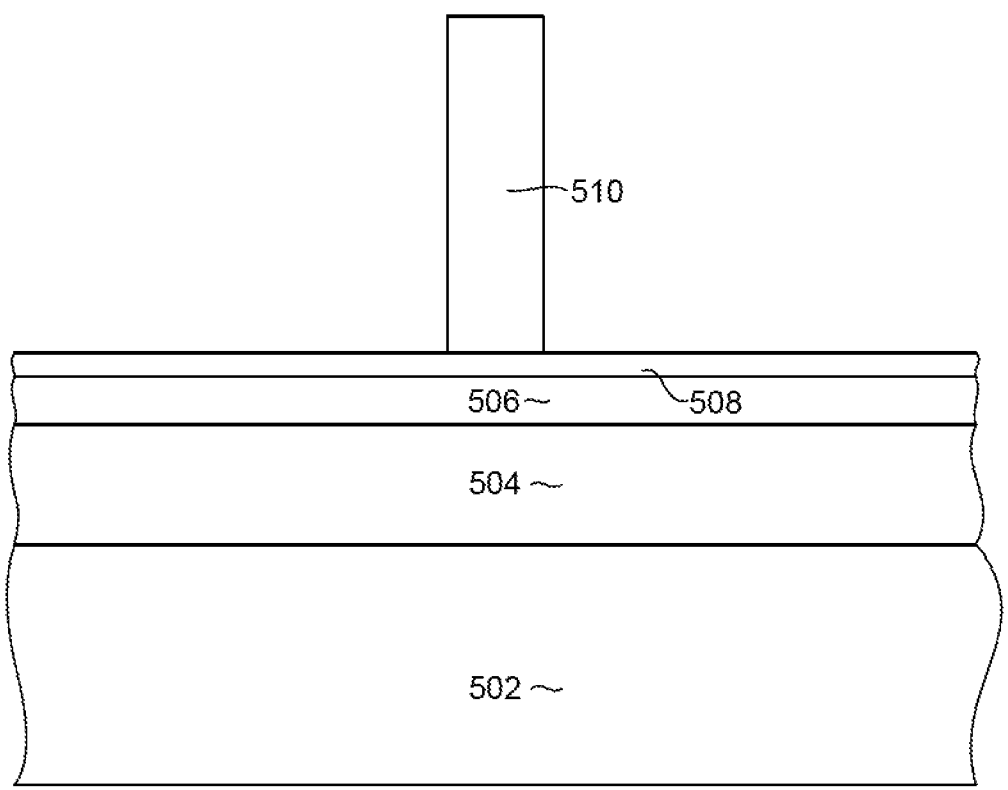
FIGS. 5-14 are views of a magnetoresistive sensor in various intermediate stages of manufacture illustrating a method of manufacturing a magnetic sensor according to an embodiment of the invention.

FIGS. 5-14 show a magnetic read head in various intermediate stages of manufacture in order to illustrate a method for manufacturing a magnetic read head according to an embodiment of the invention. With particular reference to FIG. 5, a bottom shield 502 is provided. The shield 502 can be constructed of a material such as NiFe. Then, a series of sensor layers are deposited over the shield 502. Although the sensor layers include various sensor layers such as those making up the sensor stack 302 described above with reference to FIGS. 3 and 4, they are shown collectively as layer 504 for purposes of clarity and illustration. A layer of electrically conductive material 506 can be deposited over the sensor layers 504. This layer 506 can be the capping layer 328 of FIG. 3 or can be an additional layer. The layer 506 can be constructed of Ru and can have a thickness of 5-50 nm or about 30 nm. A first CMP stop layer 508 is then deposited over the electrically conductive layer 506 and sensor stack layer 504. The first CMP stop layer 508 is a material that has a high resistance to removal by chemical mechanical polishing (CMP), and can be, for example, SiC deposited to a thickness of less than 100 nm, such as for example 5 nm. A mask 510 is then formed over the layers 502, 504, 506, 508. The mask 510 can include a layer of photoresist that has been photographically patterned and developed to have a width that is chosen to define a width of the sensor (i.e. trackwidth). In addition to photoresist, the mask 510 may also include various other layers such as one or more hard mask layers an bottom anti-reflective layer, an image transfer layer, etc (not shown).

Figure 6:
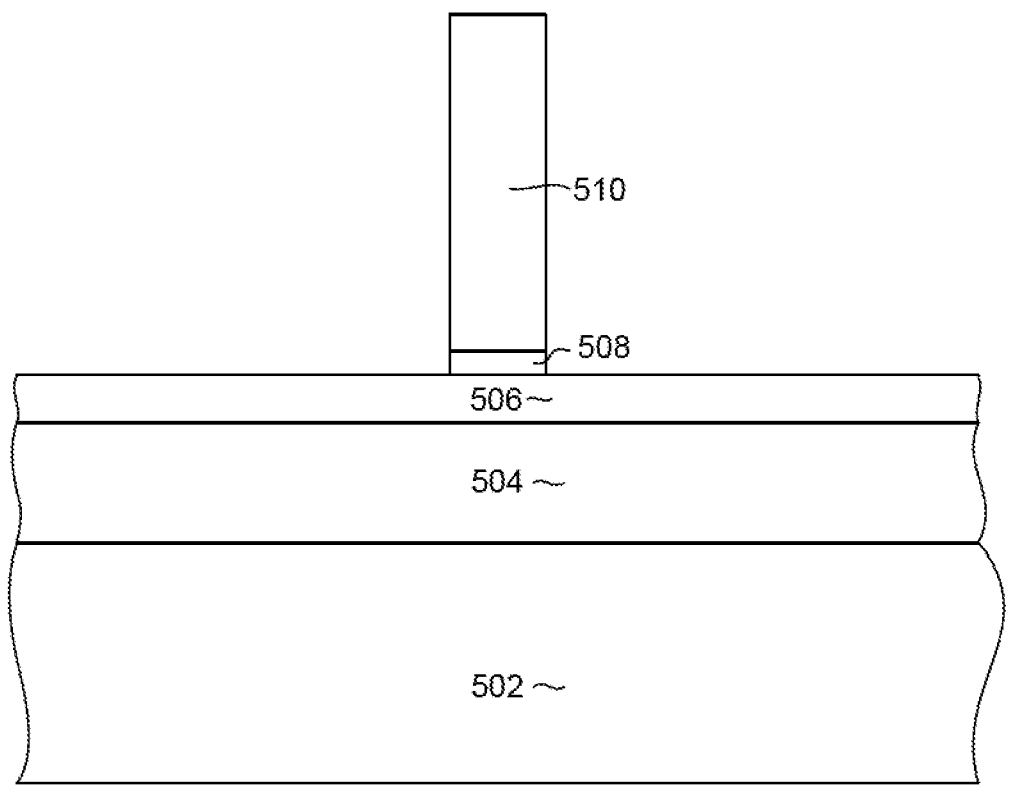

Then, with reference to FIG. 6, a reactive ion etching (RIE) is performed to remove portions of the CMP stop layer 508 that are not protected by the mask 510 to transfer the image of the mask 510 onto the CMP stop layer. The reactive ion etching can be performed in a fluorine chemistry, such as $CF_4$. After the reactive ion etching, the mask 510 and CMP stop layer 508 can have a width of 5-10 nm or about 30 nm.

Figure 7:
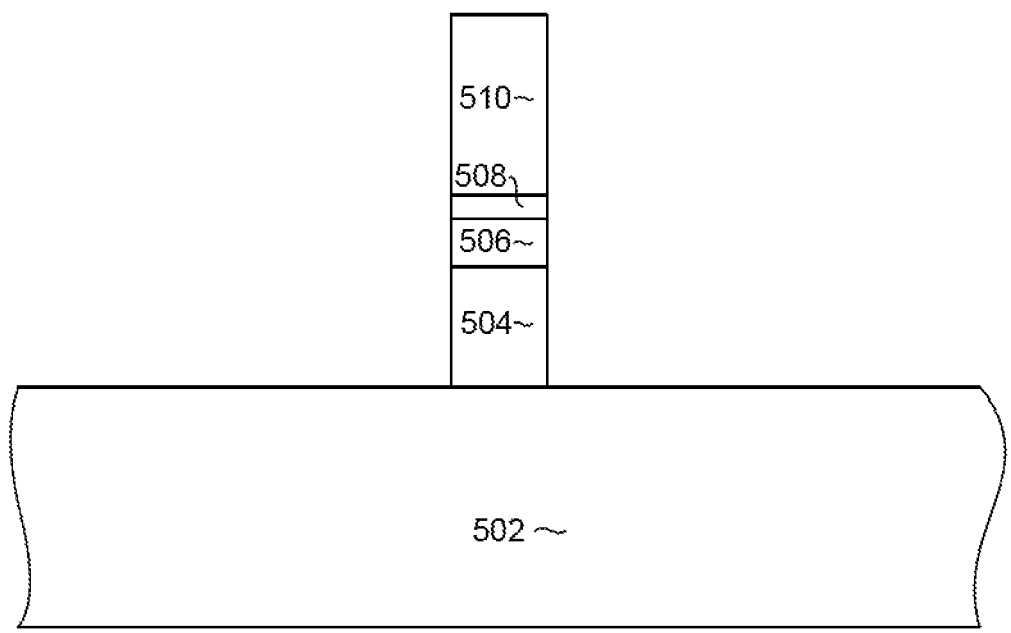

Then, an ion milling is performed to remove portions of the electrically conductive layer 506 and sensor material 504 that are not protected by the CMP stop layer 508 and mask 510, leaving a structure as shown in FIG. 7. The ion milling can be an Ar ion milling.

Figure 8:
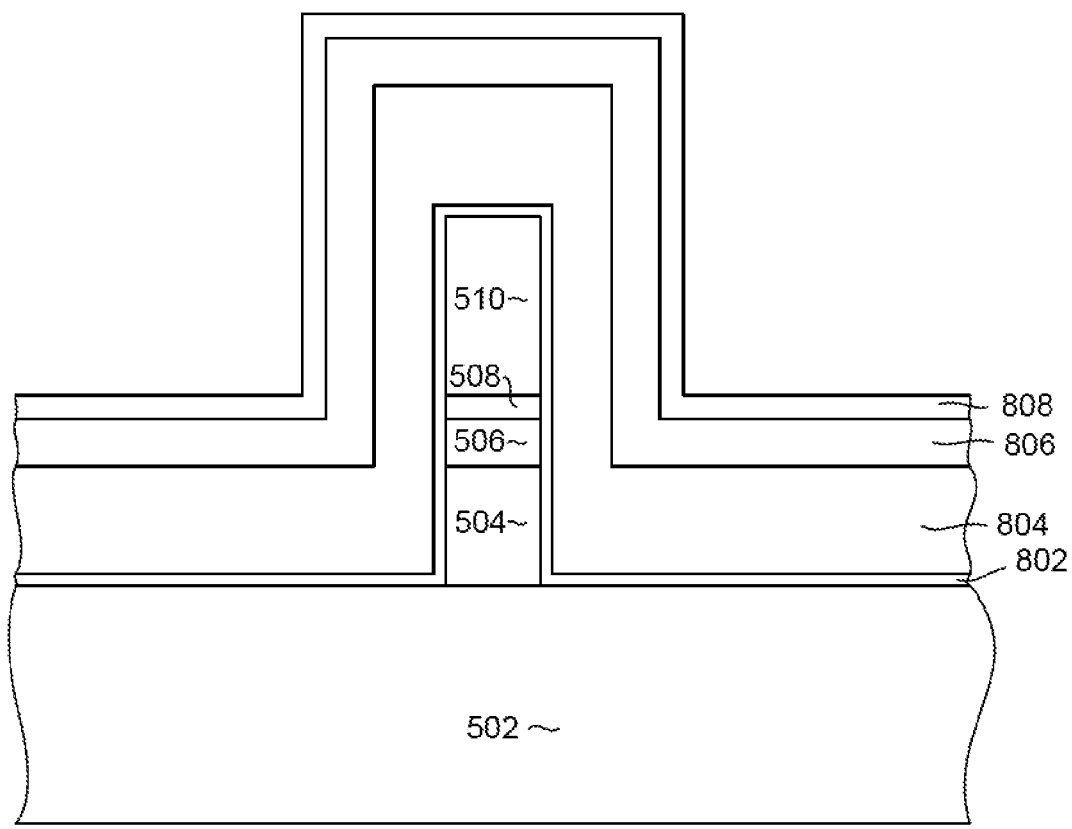

Then, with reference to FIG. 8, a thin insulation layer 802 is deposited. The insulation layer can be an electrically insulating material such as alumina and can be deposited by a conformal deposition process such as atomic layer deposition (ALD) or chemical vapor deposition (CVD) to a thickness of 1-10 nm or about 1.5 nm. A layer of hard bias material (magnetic domain control film) 804 is then deposited over the thin insulation layer 802. The hard bias material 804 can be a magnetic material having a high magnetic moment such as CoPt or CoPtCr, and can be deposited to a thickness that is about level with the top of the sensor layers 506. To this end the hard bias film 804 can be deposited to a thickness of 5-100 nm or about 13 nm. The hard bias layer 804 can be deposited by sputter deposition, such as a long throw sputter deposition method having good linearity. Then, a hard bias protective layer 806 can be deposited over the hard bias layer 804. The protective layer can be, for example, Cr and can be deposited to a thickness of 5-50 nm or about 10 nm. A second CMP stop layer 808 is then deposited over the protective layer. The CMP stop layer 808 is a material that is resistant to removal by chemical mechanical polishing (CMP), and can be SiC having a thickness less than 100 nm, such as about 10 nm. The protective layer 806 and CMP stop layer 808 can be deposited by sputter deposition.

Figure 9:
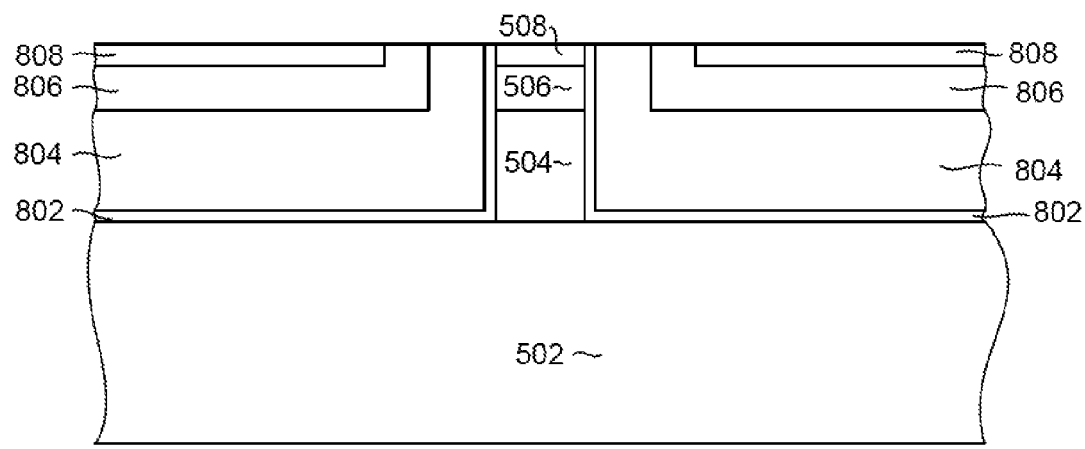
Figure 10:
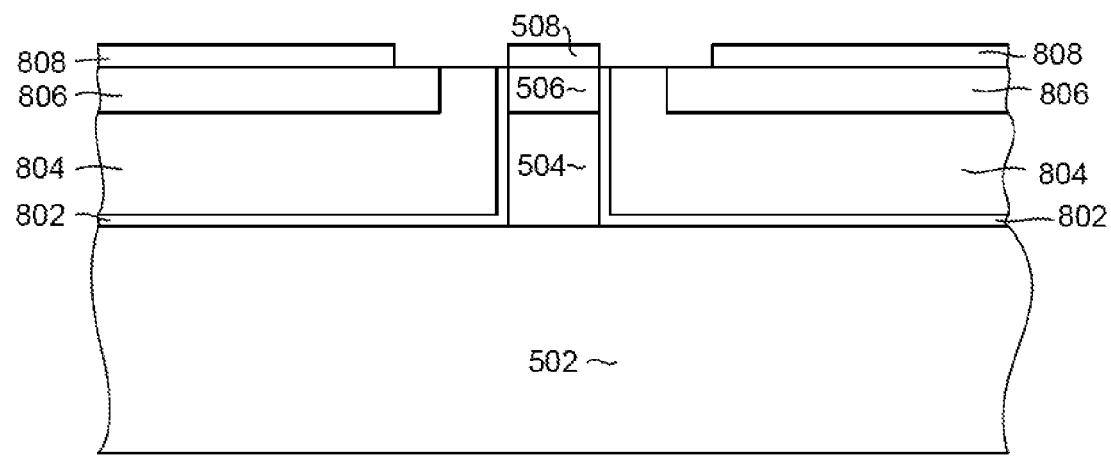

After the layers 802, 804, 806, 808 have been deposited as described above, a chemical mechanical polishing (CMP) is performed to remove the mask 510. This CMP planarizes the structure, leaving a structure as shown in FIG. 9. As can be seen in FIG. 9, the CMP stops at the first and second CMP stop layers 508, 808.

Figure 11:
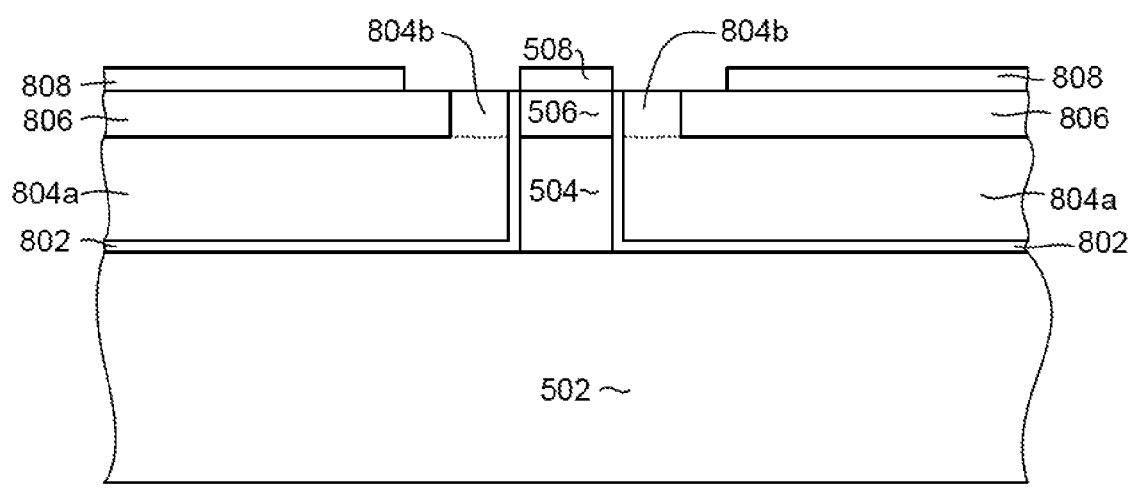

As can be seen in FIG. 11, the above described process leaves a portion 804b of the hard bias material 804 extending upward to form a tail portion that is exposed, while the main portion 804a is disposed below. This portion 804b can then be seen to be a bi-product of the manufacturing method that forms the hard bias structure 804. As discussed above, in prior art magnetic sensors this portion 804b was magnetic and therefore could magnetically couple with the upper magnetic shield 306 (FIG. 3) causing undesired negative performance effects. Preventing this coupling of the magnetic bias structure 332 with the shield 306 (as shown in FIG. 3) required the inclusion of a thick non-magnetic, electrically conductive layer beneath the shield 306, which undesirably increased the gap distance. In the present invention, however, the upper tail portion 804b (in FIG. 11) is demagnetized as described below preventing the portion 804b from magnetically coupling with the shield (not yet formed). This demagnetization is performed by a method described herein below.

With the CMP stop layers 508, 808 remaining over the sensor 504 and protective layer 806, a demagnetizing process is performed to magnetically weaken the upper tail portion 804b. The demagnetization process can be performed by injecting a non-magnetic element into the upper tail portion 804b. The non-magnetic material can be one or more of O, N, Ar, Ne, Xe, Cr, Ta or C. The injection of the non-magnetic element can be achieved by a reactive ion etching process (ME). For example, nitrogen can be injected into the layer 804b by performing a reactive ion etching in a nitrogen containing gas. This causes nitrogen to diffuse into the layer 804b. Alternatively the injection of a non-magnetic material into the layer 804b can be achieved by ion injection. The presence of the CMP stop layers (and also the protective layer 806) prevents the nitrogen from being diffused into the main portion of the hard bias layer 804a or into the sensor layers 504 or layer 506 by masking these layers 804a, 504, 506 and preserving the magnetic performance of these layers.

Figure 12:
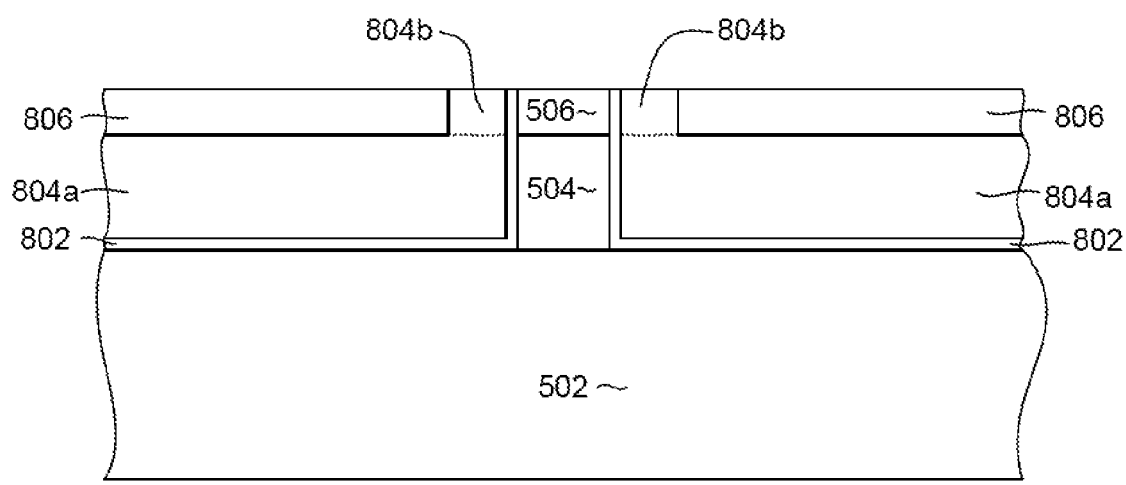
Figure 13:
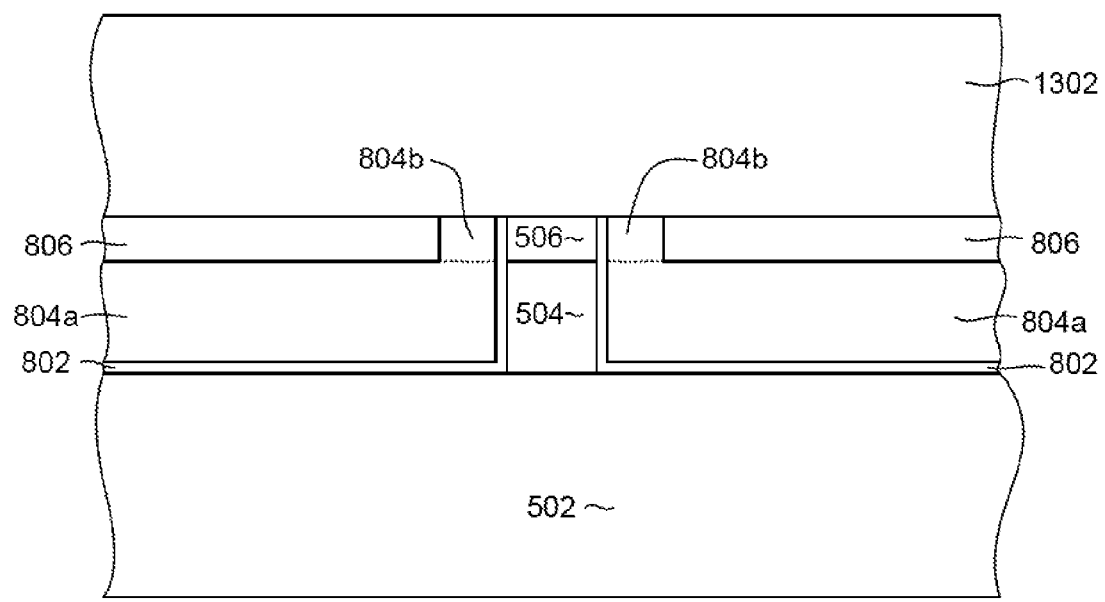

After the upper bias layer tail portions 804b have been magnetically weakened by the addition of a non-magnetic material, another reactive ion etching can be performed to remove the remaining CMP stop layers 508, 808. This reactive ion etching is performed in a chemistry and under conditions chosen to preferentially remove the material making up the first and second CMP stop layers. If the protective layer 806 is constructed of Ru and the first and second CMP stop layers 508, 808 are constructed of Cr, the reactive ion etching used to remove the CMP stop layers 508, 808 can be performed using a fluorine containing atmosphere, such as, for example, $CF_4$. In this case a reactive ion etching in a fluorine gas will preferentially remove the CMP stop layers, 508, 808, but the layers 806, 804, 506 will have a strong resistance to removal in the fluorine RIE. Therefore, the layers 508, 808 will be removed, but the layers 506, 804b, 806 will remain intact, thereby leaving a structure as shown in FIG. 12.

After the CMP stop layer s 508, 808 have been removed as described above, an upper magnetic shield 1302 can be formed over the layers 506, 804b, 806. The shield 1302 can be formed of a material such as NiFe by a process such as electroplating. It can be seen that by magnetically weakening the upper bias layer tail portion 804b, magnetic coupling between the functional main portion of the hard bias layer 804a and the shield 1302 can be prevented even without forming a non-magnetic layer beneath the shield.

Figure 14:
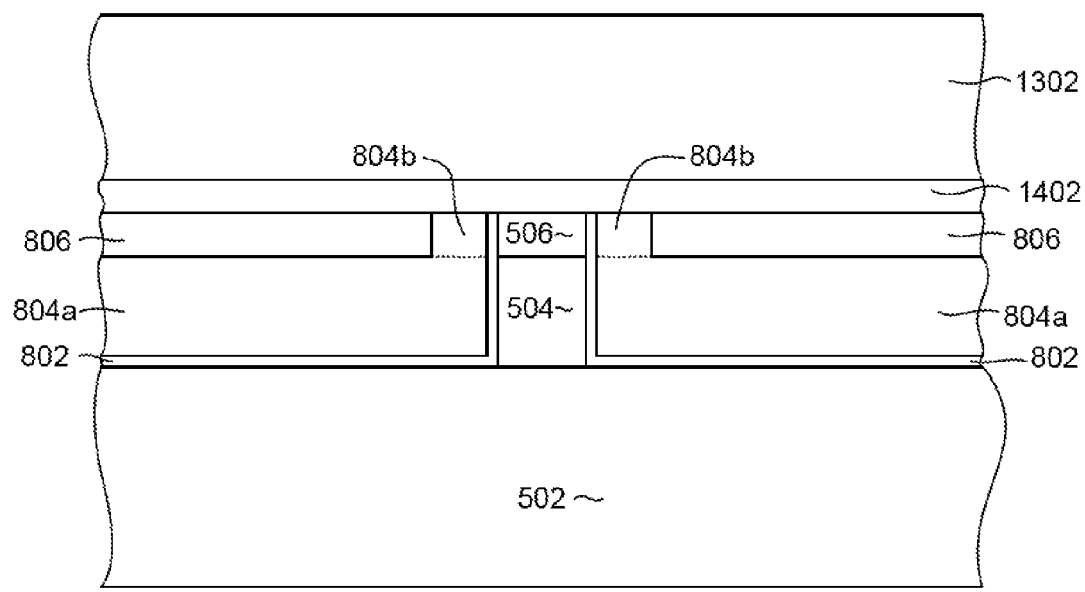

With reference to FIG. 14, in an alternate embodiment of the invention, a non-magnetic, electrically conductive layer 1402 can be deposited prior to forming the shield 1302. This non-magnetic layer 1402 can be used when additional prevention of magnetic coupling between the hard bias layer 804 and shield 1302 is desired. Although the additional non-magnetic layer 1402 increases the read gap slightly, this layer 1402 can be much thinner than would be possible without the demagnetization of the upper hard bias tails 804b.

Figure 15:
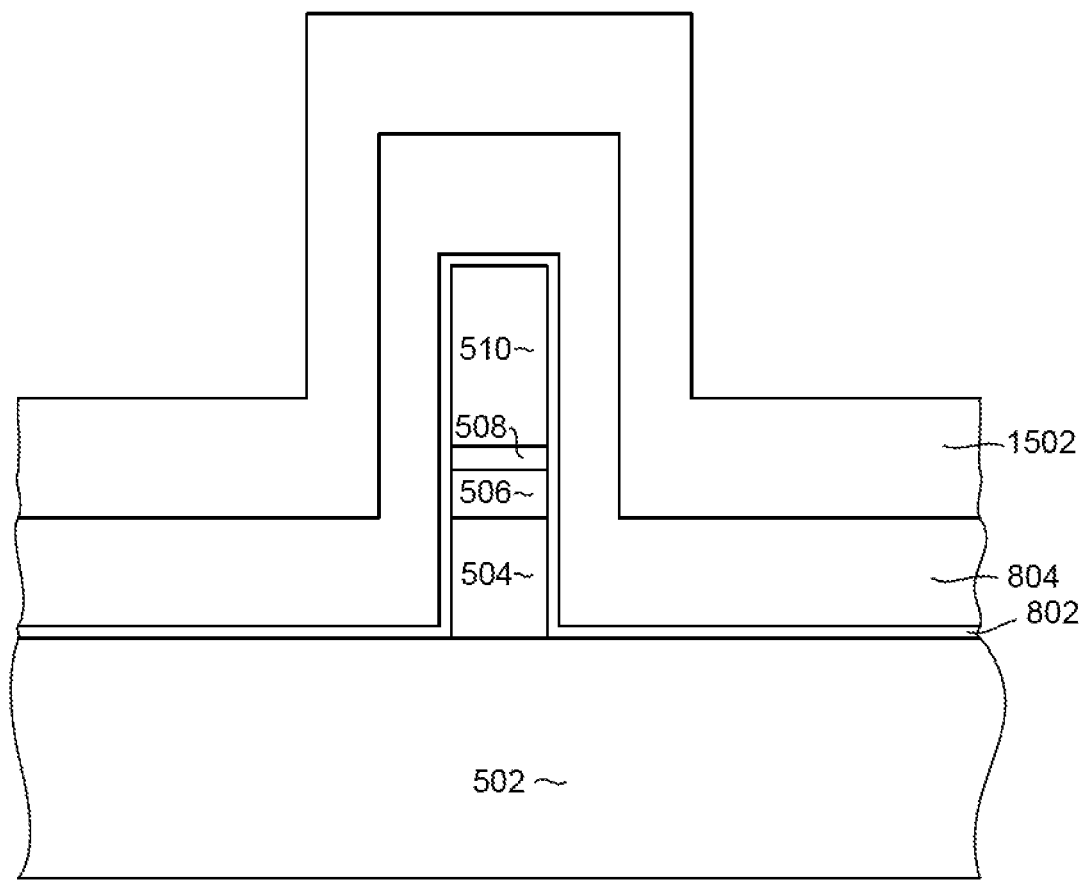
FIGS. 15-21 are views of a magnetoresistive sensor in various intermediate stages of manufacture illustrating a method of manufacturing a magnetic read sensor according to an alternate embodiment of the invention.

FIGS. 15-21 show a sensor in various intermediate stages of manufacture illustrating a method of manufacturing a magnetic sensor according to an alternate embodiment of the invention. The process begins with the formation of a structure as described above with reference to FIG. 7. Then, with reference to FIG. 15, a thin insulation layer 802 is deposited by a conformal deposition process such as atomic layer deposition (ALD) or chemical vapor deposition (CVD). The thin insulation layer 802 can be alumina ($Al_2O_3$) and can be deposited to a thickness of 1-10 nm or about 1.5 nm. Then, a long throw sputtering having superior linearity can be performed to deposit a layer of magnetic bias material 804 over the insulation layer 802. The magnetic hard bias material is a magnetic material having a high magnetic coercivity such as CoPt or CoPtCr, and can be deposited to a thickness of 5-100 nm or about 13 nm. The hard bias material 804 is preferably deposited to a thickness that is about level with the top of the sensor layers 504 as shown in FIG. 15.

Then, with continued reference to FIG. 15, a hybrid protective layer/CMP stop layer 1502 is deposited. This hybrid protective/CMP stop layer 1502 can have a thickness of from 5 to 50 nm or about 10 nm, and is preferably a material having a large atomic weight and a high density so that the penetration depth of the nonmagnetic element (applied in a later step) will be lower in this layer 1502 than in the hard magnetic material 804. An atomic weight of a least 100 and a density of at least 9000 g/m3 are preferred. The hybrid protective layer/CMP stop layer 1502 can be constructed of Ru, Rh, Hf, W, Re, Os, Ir, Pt, Bi or an oxide or nitride of Ru, Rh, Hr, W, Re, Os, Ir, Pt, Bi.

Figure 16:
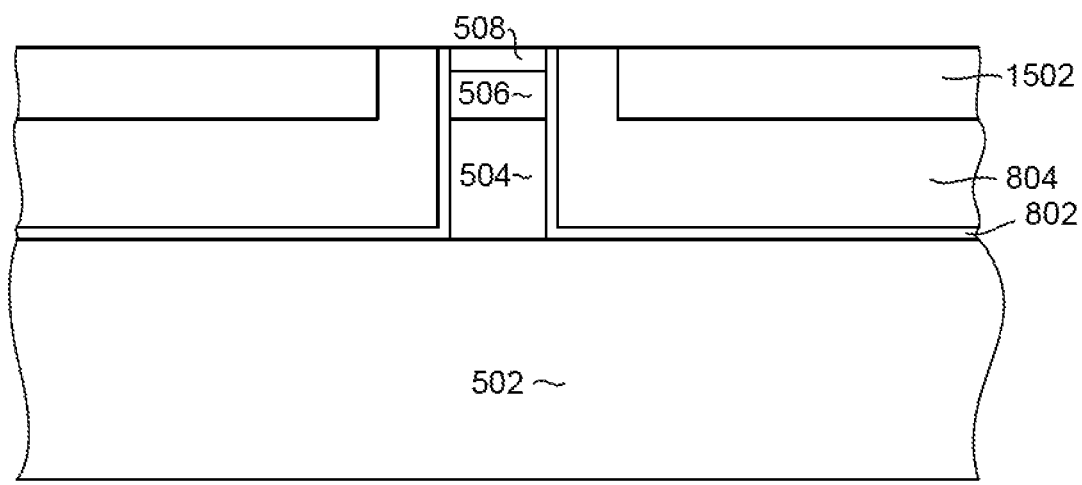
Figure 17:
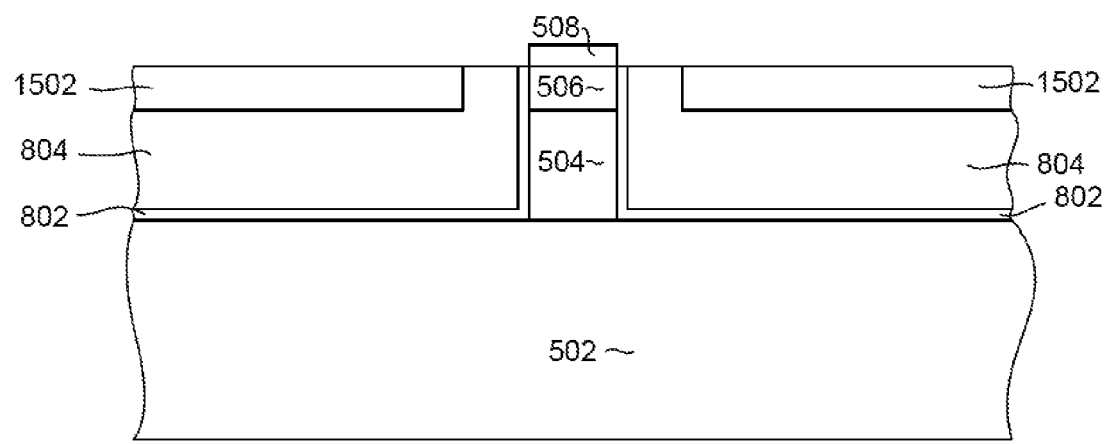

Next, a chemical mechanical polishing process is performed to remove the mask 510, thereby planarizing the surface and leaving a structure as shown in FIG. 16. Next, an ion milling is performed to remove a portion of the layers 804, 1502 with the first CMP stop layer 508 acting as a mask. This leaves a structure as shown in FIG. 17. The ion milling is performed until the layers 804, 1502 are at a desired thickness, preferably until the layers 804, 1502 have a surface that is substantially coplanar with the top of layer 506 as shown in FIG. 17.

Figure 18:
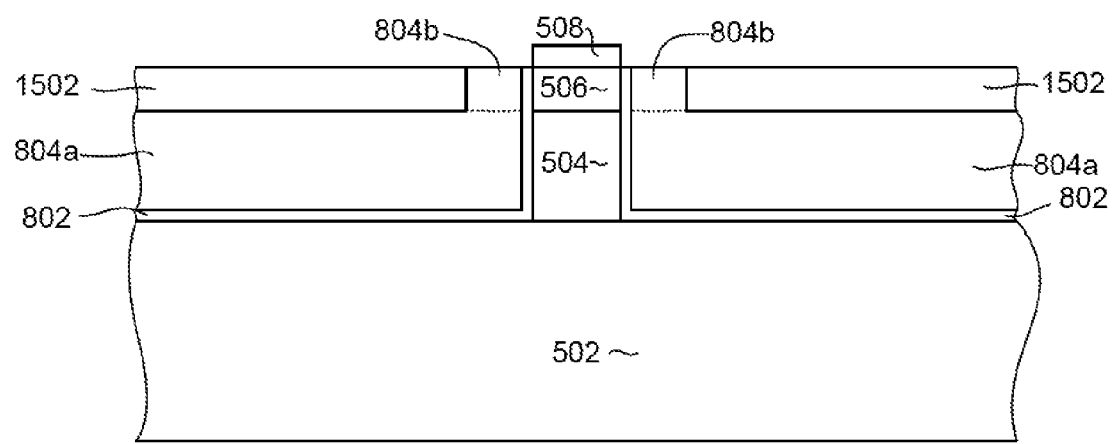

Next, the upward extending portion of the hard bias material 804 is magnetically weakened by injecting it with a non-magnetic material to form a non-magnetic (or magnetically weakened) upward projecting portion 804b of the hard bias material 804 and a magnetic lower main portion 804a of the hard bias material 804, as shown in FIG. 18. As before, the layer portion 804b can be magnetically weakened by performing a reactive ion etching in a nitrogen containing atmosphere to inject nitrogen atoms into the layer portion 804b or could be accomplished by ion injection. The layers 506, 1502 act as masks during this reactive ion etching process (or ion injection process) to protect the main hard bias portion 804a and the sensor 504, and preventing the non-magnetic material from being implanted into these layers. Because the layer 1502 has a higher atomic weight and density than the upper hard bias portion 804b, the penetration depth of the nonmagnetic element into the layer 1502 is much shallower than into the layer 804b, and the non-magnetic element does not penetrate into the lower main hard bias structure 804a. Damage to the hard bias structure 804a can therefore, be prevented.

Figure 19:
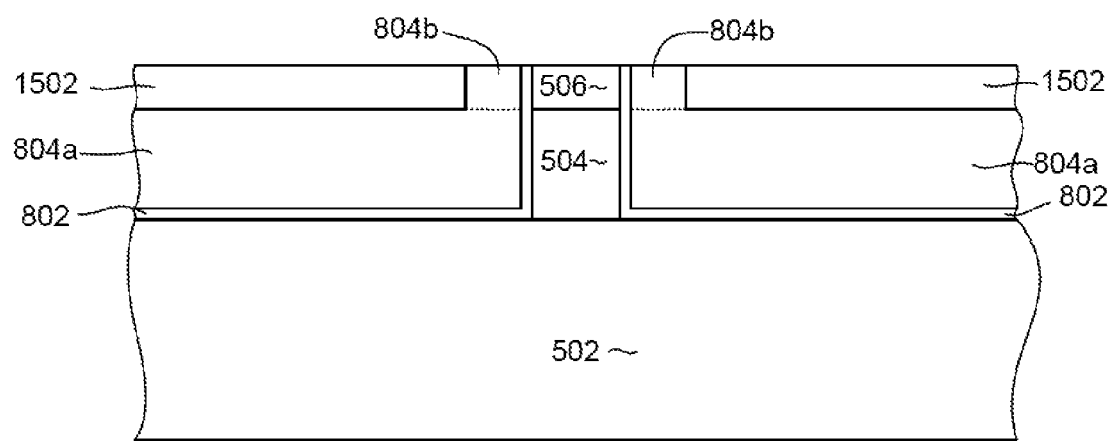

After the hard bias portion 804b has been magnetically weakened as discussed above, the first CMP stop layer 508 can be removed by performing another reactive ion etching, preferably in a fluorine containing gas such as $CF_4$. This leaves a structure as shown in FIG. 19. Because the electroconductive layer 506 (which is preferably Ru) and the hybrid CMP stop/protective layer 1502 are both resistant to removal by fluorine based reactive ion etching, they are not removed by the reactive ion etching that removes the CMP stop layer 508 (FIG. 18).

Figure 20:
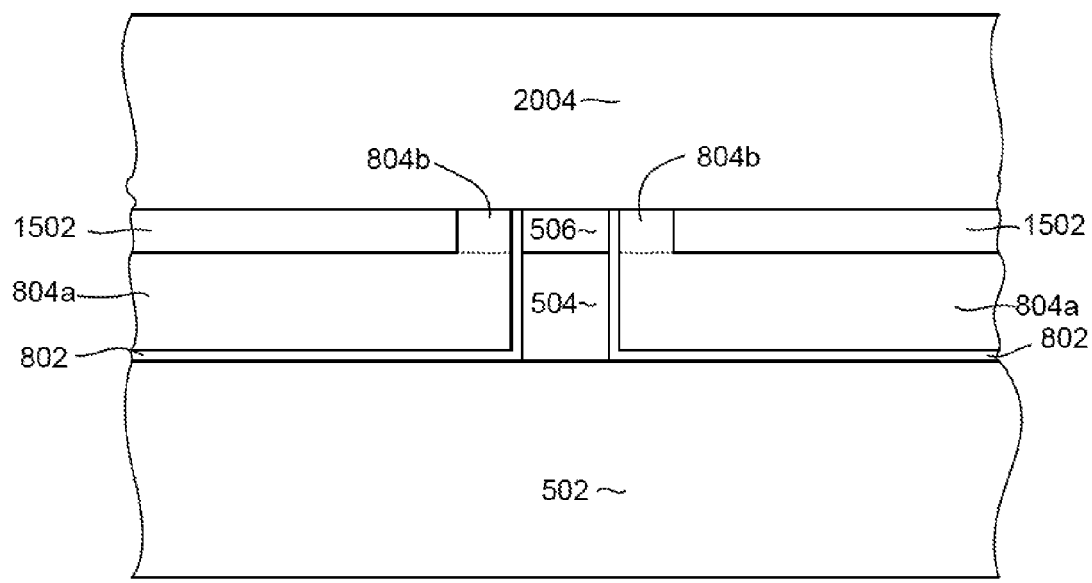

With reference now to FIG. 20, an upper magnetic shield 2004 can be formed over the layers 506, 804b, 1502 by a process such as electroplating. The shield 2004 can be constructed of a material such as NiFe. Because the layers 804b have been magnetically weakened as described above, there is no magnetic coupling between the main hard bias portion 804a and the shield 2004.

Figure 21:
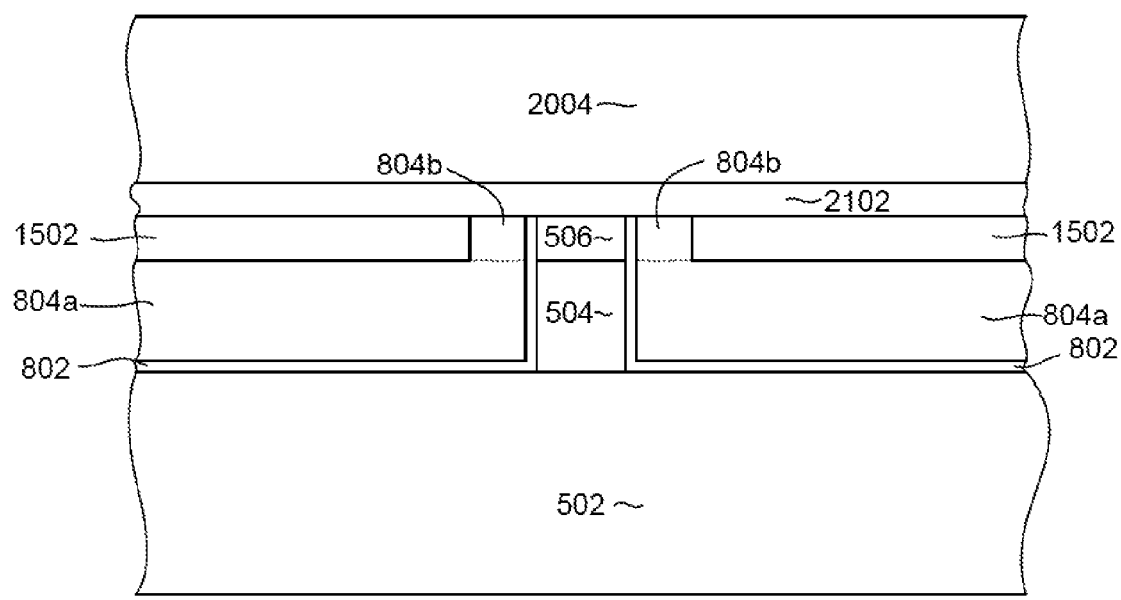

If additional magnetic de-coupling between the layer 804a and shield 2004 is desired, an additional non-magnetic gap layer 2102 can be provided directly beneath the shield 2004 as shown in FIG. 21. Because the upper bias layer portion 804b has been magnetically weakened, the non-magnetic gap layer 2102 can be much thinner than would otherwise be possible without this magnetic weakening.

Figure 22:
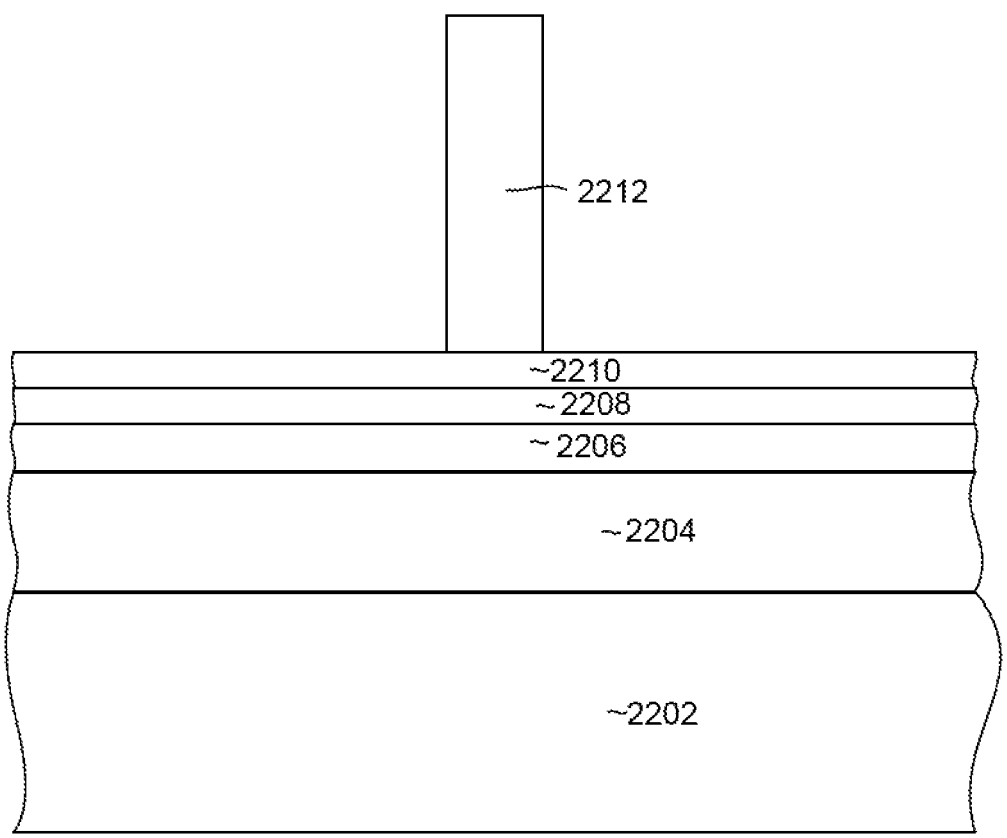
FIGS. 22-32 are views of a magnetoresistive sensor in various intermediate stages of manufacture illustrating a method of manufacturing a magnetic read sensor according to another alternate embodiment of the invention.

FIGS. 22-32 illustrate another possible method for manufacturing a magnetic read sensor according to an embodiment of the invention. With particular reference to FIG. 22, a bottom shield 2202 is provided and a series of sensor layers shown collectively as layer 2204 are deposited on the shield. An electrically conductive layer 2206 is deposited over the sensor layer 2204. The electrically conductive layer 2206 can be constructed of Ru and can have a thickness of 5-50 nm or about 5 nm. A first protective layer 2208 is deposited over the electrically conductive layer 2206. The first protective layer 2208 is preferably a material having a large atomic weight and a high density. An atomic weight of at least 100 and a density of at least 9000 g/m³ are preferred. The first protective layer 2208 can be constructed of Ru, Rh, Hf, W, Re, Os, Ir, Pt, Bi or an oxide or nitride of Ru, Rh, Hf, W, Re, Os, Ir or Bi. The first protective layer 2202 is preferably Ir. A CMP stop layer 2210 is then deposited over the protective layer 2208. The CMP stop layer can be SiC and is preferably less than 100 nm thick, such as 5 nm.

With continued reference to FIG. 22, a mask structure 2212 is formed over the layers 2202, 2204, 2206, 2208, 2210. The mask structure has a width that is configured to define a track width of the finished sensor. The mask 2212 can include a photoresist layer that has been photolithographically patterned to have the desired width and may include other layers such as, but not limited to, an image transfer layer, one or more hard mask layers and a bottom anti-reflective coating (BARC) all of which are not individually shown in FIG. 22.

Figure 23:
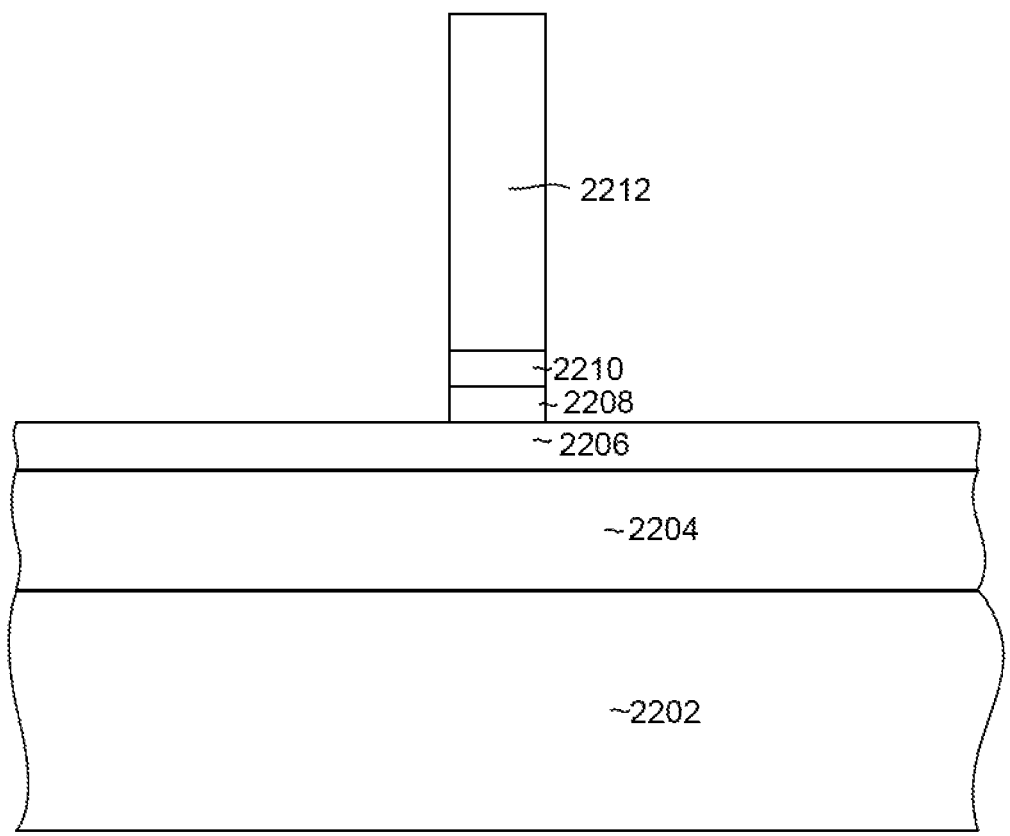

Then, with reference to FIG. 23, the image of the mask 2212 is transferred onto the underlying layers 2210, 2208 by performing a reactive ion etching to remove portions of the layers 2210, 2208 that are not protected by the mask structure 2212. The reactive ion etching can be performed using a fluorine containing gas such as $CF_4$, with the mask 2212 patterned width after reactive ion etching is 5-50 nm or about 30 nm.

Figure 24:
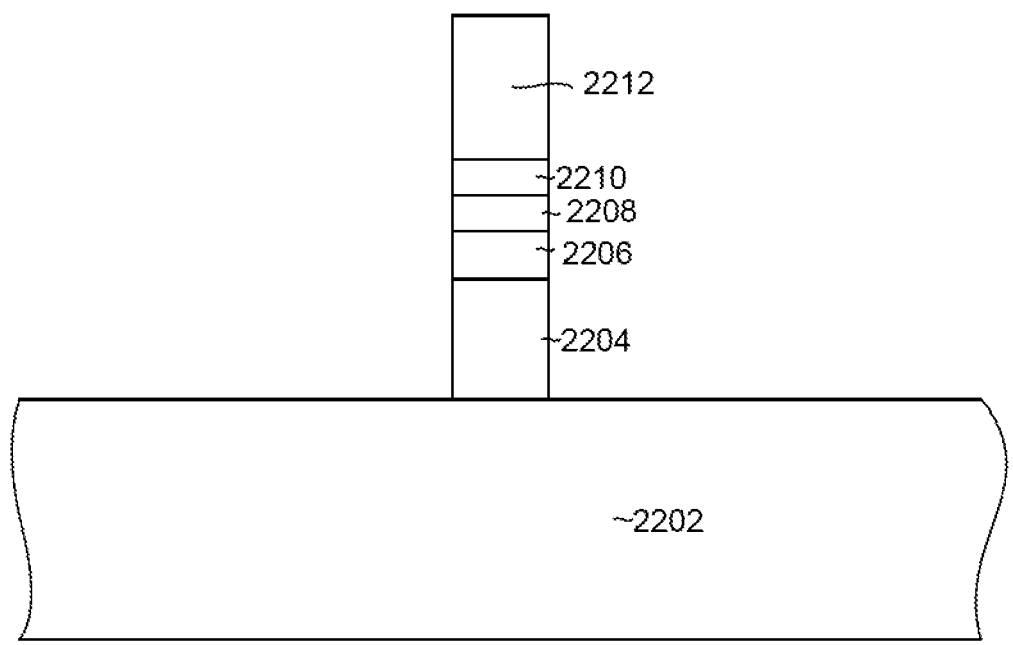

Then, with reference to FIG. 24 an ion milling is performed to remove portions of the layers 2206, 2204 that are not protected by the layers 2208, 2210, 2212, thereby transferring the image of these layers onto the under-lying sensor 2204 and electrically conductive layer 2206. The ion milling is preferably an argon ion milling, and can be performed until the bottom shield 2202 is exposed.

Figure 25:
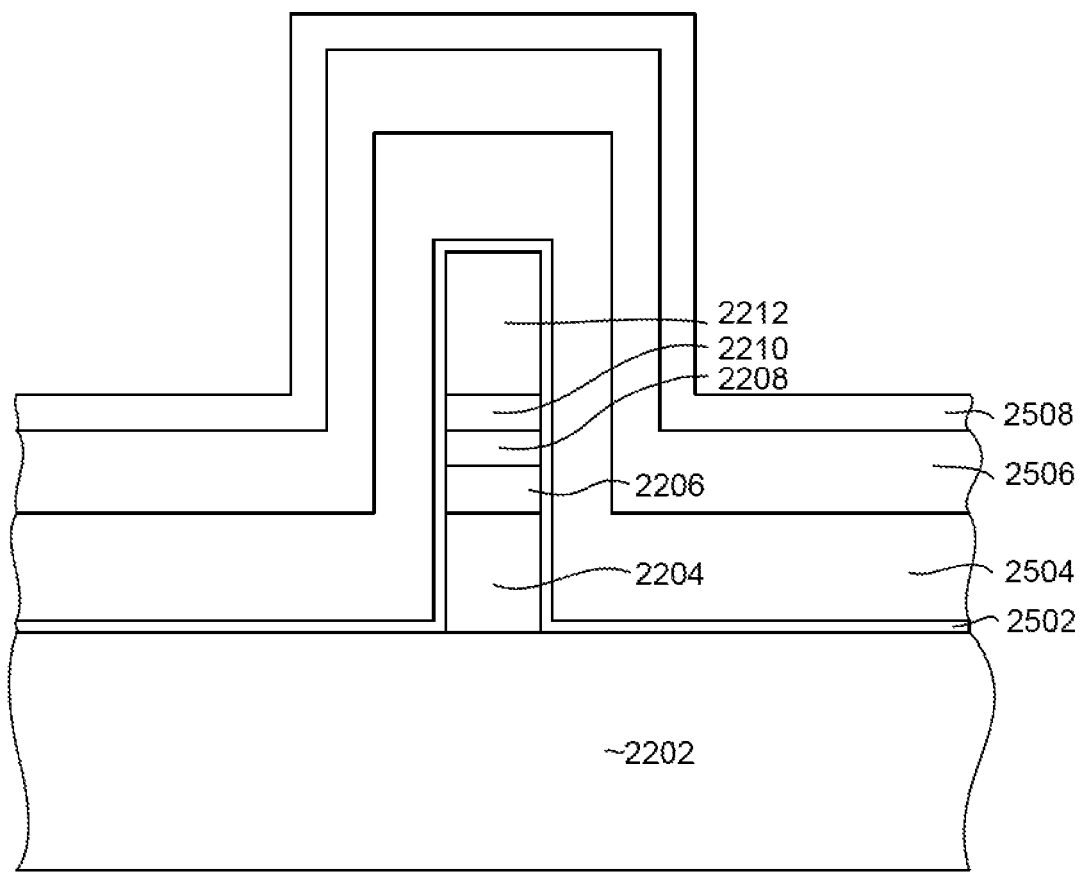

With reference to FIG. 25, a thin electrically insulating layer 2502 is deposited. The thin electrically insulating layer 2502 is preferably alumina ($Al_2O_3$) deposited by a conformal deposition process such as atomic layer deposition or chemical vapor deposition to a thickness of 1-10 nm or about 1.5 nm. Then, a hard magnetic bias layer 2504 is deposited over the insulation layer 2502. The hard magnetic bias material 2504 is a magnetic material having a high magnetic coercivity such as CoPt or CoPtCr, and can be deposited by sputter deposition to a thickness of 5-100 nm or about 13 nm. The hard magnetic bias material 2504 is preferably deposited to a thickness that is about level with the top of the sensor material layer 2404 as shown in FIG. 25.

With continued reference to FIG. 25 a second protective layer 2506 is deposited over the hard magnetic material 2504. Like the first protective layer 2208, the second protective layer is a material having a high atomic weight and density such as Ir, and can be deposited by sputtering to a thickness of 5-50 nm or about 10 nm. Then, a second CMP stop layer 2508 is deposited over the protective layer 2506. The second CMP stop layer 2508 can be constructed of SiC and can be deposited by sputter deposition to a thickness of less than 100 nm, such as about 10 nm.

Figure 26:
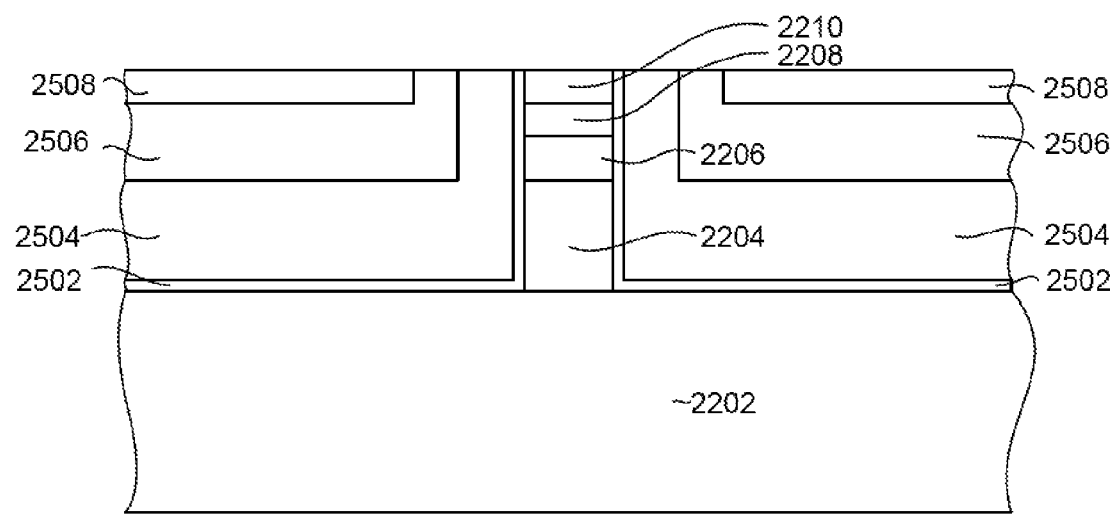
Figure 27:
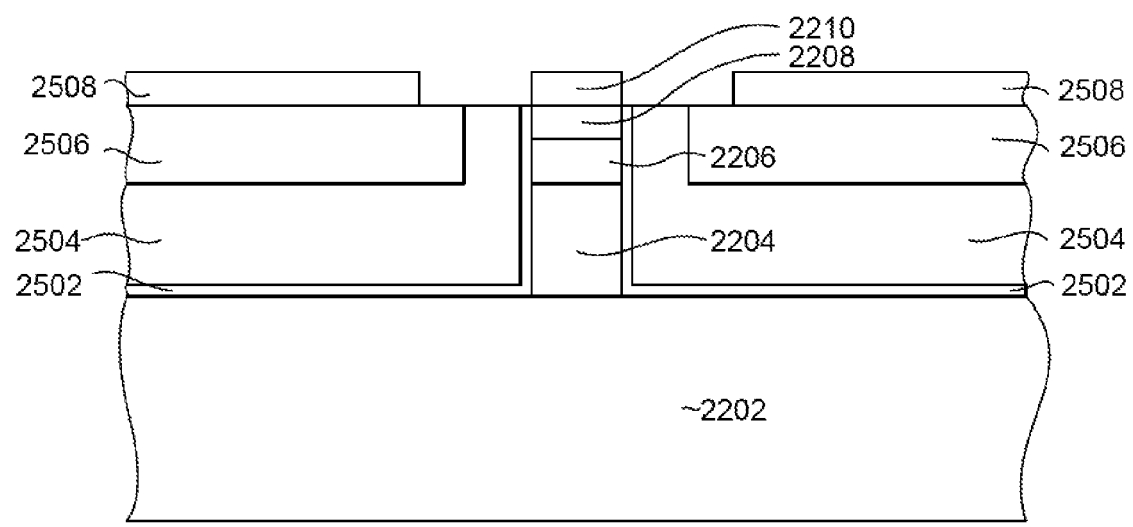
Figure 28:
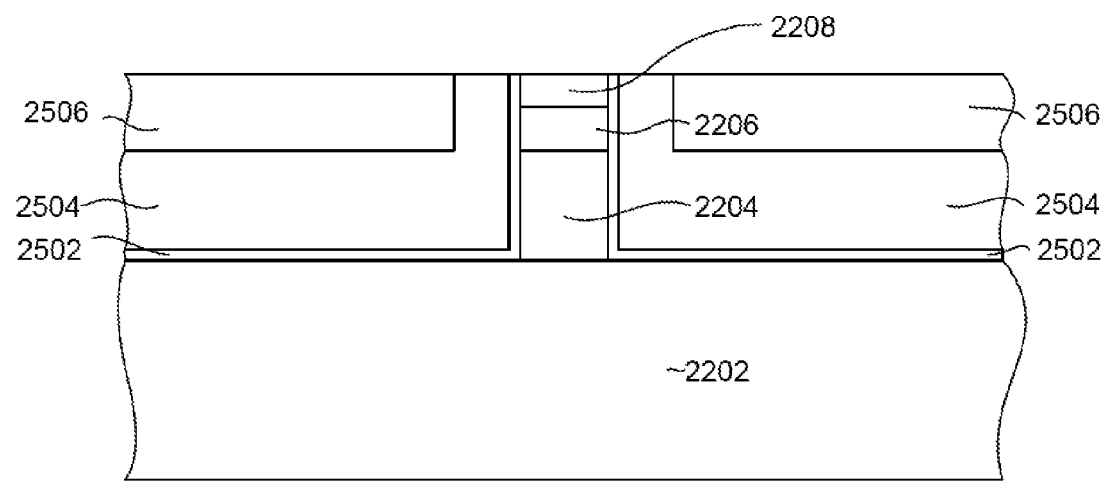

A chemical mechanical polishing process can then be performed to remove the mask 2212 and for planarization, leaving a structure as shown in FIG. 26. The chemical mechanical polishing stops at the first and second CMP stop layers 2210, 2508. With reference now to FIG. 26, an ion milling is performed to remove a portion of layers 2504, 2506 that are protected by the CMP stopper layers 2210, 2508. The ion milling is preferably performed until the layers 25504, 2506 are about level with the top of first protective layer 2208 as shown in FIG. 27. A reactive ion etching, preferably using a fluorine gas such as $CF_4$, is performed to remove the first and second CMP stop layers 2210, 2508, leaving a structure such as that shown in FIG. 28. The layers 2208, 2506, which are preferably constructed of Ir, have a strong resistance to the fluorine based reactive ion etching, and are, therefore, left intact after the reactive ion etching.

Figure 29:
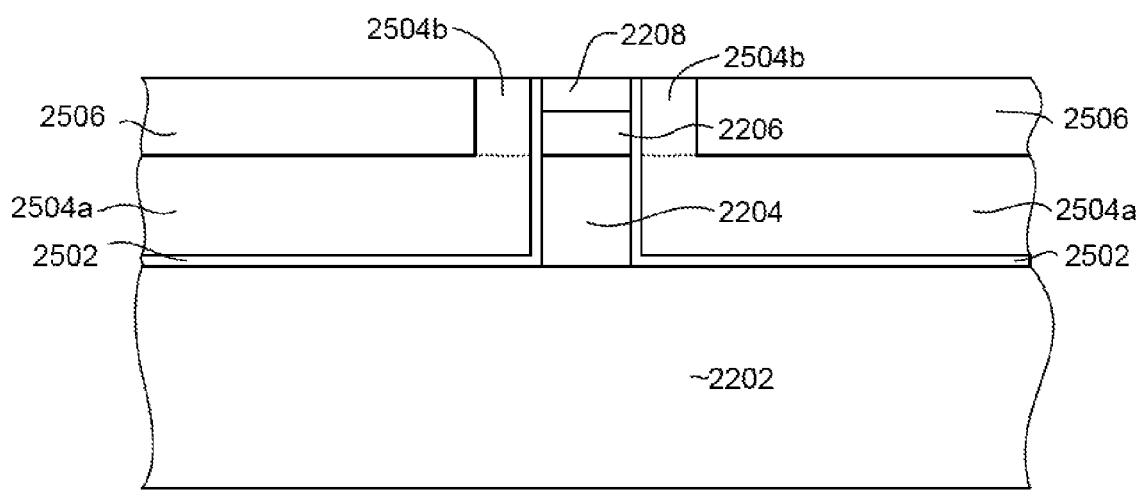

Then, with reference to FIG. 29, the upward extending portion of the hard bias structure 2504b is demagnetized by injecting a non-magnetic element into it while leaving the main portion of the hard bias material 2504a magnetic and unaffected. The non-magnetic element can be injected into the upper bias layer portion 2504b by performing a reactive ion etching in an atmosphere that contains a non-magnetic element, such as in a nitrogen gas. The protective layers 2208, 2506 prevent the non-magnetic element from reaching the main bottom portion of the hard bias layer 2504a or the sensor 2204. Because the protective layers 2208, 2506 have a larger atomic weight and density than the hard bias material 2504b, the penetration depth of the non-magnetic element is shallower in the protective layers 2208, 2506 than in the magnetic bias material 2504b. This allows the non-magnetic element to penetrate into the hard bias material 2504b without penetrating through the protective layers 2506, 2208. In this way, the upper portions 2504b of the hard magnetic bias layers 2504b can be de-magnetized without affecting the lower main portion of the hard bias layer 2504a or the sensor 2204.

Figure 30:
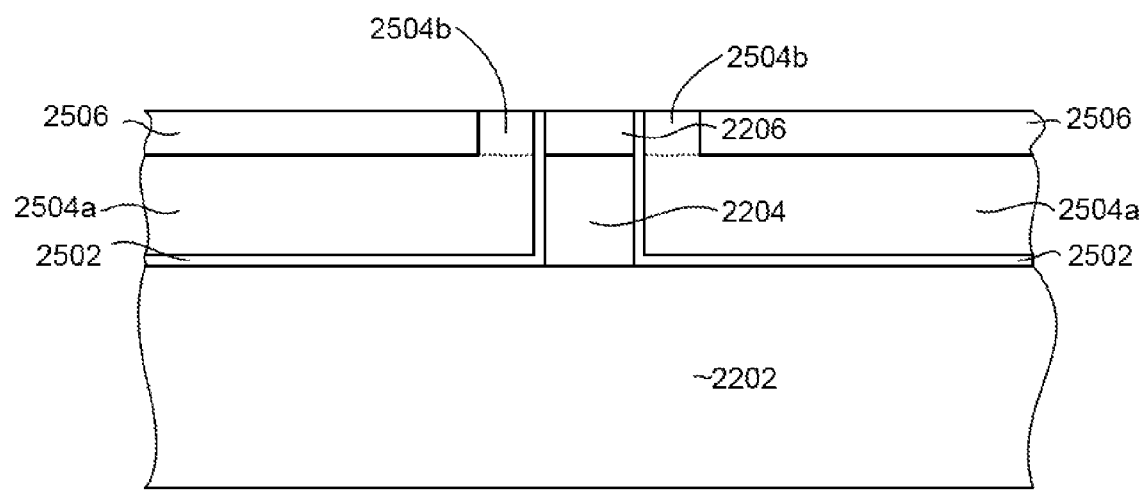

With reference now to FIG. 30, after the layer 2504b has been de-magnetized as discussed above, an ion milling (preferably an Ar in milling) can be performed to remove the protective layer 2208 and a portion of the protective layer 2504b. The ion milling is preferably performed until a desired read gap thickness has been reached. The ion milling is also preferably performed until a level at or beyond a level to which the non-magnetic element has penetrated into the protective layer 2506 has been reached. In this way, the portion of the protective layer 2506 into which the non-magnetic element has penetrated can be removed.

Figure 31:
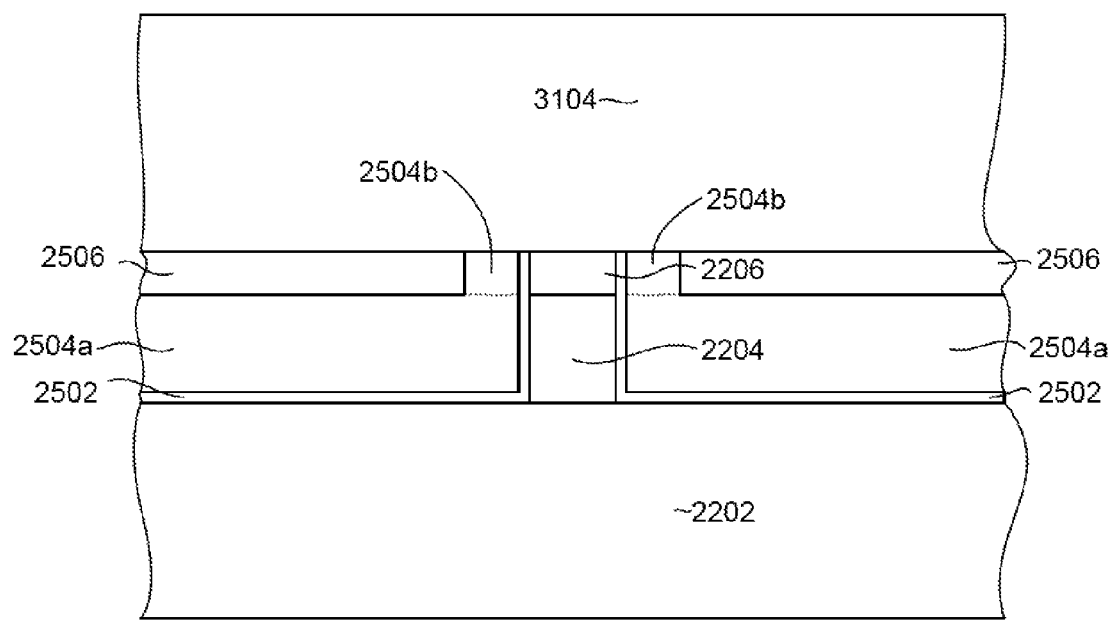
Figure 32:
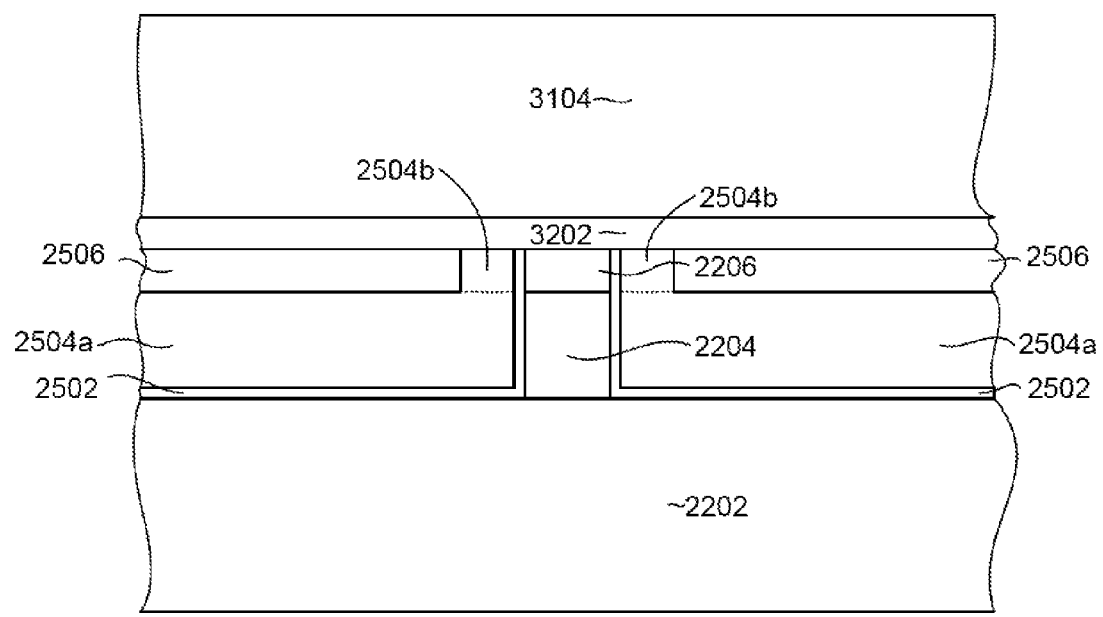

Then, with reference to FIG. 31 an upper magnetic shield 310 can be formed by a process such as electroplating using a material such as NiFe. As with the previously described embodiments, because the upper portion of the hard bias layers 2504b have been demagnetized, magnetic coupling between the main magnetic hard bias portion 2504a and the shield 3104 is prevented. With reference to FIG. 32, if further magnetic de-coupling is desired, a non-magnetic gap layer 3202 can be provided beneath the shield 3104. Because the upper portion of the hard bias layer 2504b has been demagnetized, the non-magnetic gap layer 3202 can be much thinner than would otherwise be necessary.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic sensor, comprising:
 first and second, electrically conductive magnetic shields;
 a sensor stack sandwiched between the first and second magnetic shields, the sensor stack having first and second laterally opposed sides;
 first and second magnetic biasing layers extending laterally from the first and second sides of the sensor stack;
 first and second non-magnetic protective layers each being located between the second electrically conductive shield and one of the first and second magnetic layers;
 wherein the magnetic bias layer has a tail portion that extends toward the second shield and is disposed between the non-magnetic protective layer and the sensor stack, the tail portion being demagnetized.

2. The magnetic read sensor as in claim 1 wherein the tail portion of each of the magnetic bias layers has a non-magnetic element infused therein.

3. The magnetic read sensor as in claim 1 wherein the tail portion of each of the magnetic bias layers has nitrogen atoms diffused therein.

4. The magnetic read sensor as in claim 1 wherein each of the magnetic bias layers is separated from the sensor stack by a thin layer of electrically insulating material.

5. The magnetic read sensor as in claim 1 wherein each of the magnetic bias layers is separated from the sensor stack by a thin layer of alumina.

6. The magnetic read sensor as in claim 1 wherein the tail portion of each of the magnetic bias layers extends to the second electrically conductive magnetic shield.

7. The magnetic read sensor as in claim 1 further comprising a non-magnetic gap layer disposed between the second electrically conductive shield and the sensor stack, tail portion of the magnetic bias material and non-magnetic protective layer.

8. The magnetic read sensor as in claim 1 wherein the tail portion of the magnetic bias layer comprises CoPt with a non-magnetic element infused therein and the rest of the magnetic bias layer comprises CoPt.

9. The magnetic read sensor as in claim 1 wherein the tail portion of the magnetic bias layer comprises CoPtCr with a non-magnetic element infused therein and the rest of the magnetic bias layer comprises CoPtCr.

10. The magnetic read sensor as in claim 1 wherein the tail portion of the magnetic bias layer comprises CoPt with nitrogen infused therein and the rest of the magnetic bias layer comprises CoPt.

11. The magnetic read sensor as in claim 1 wherein the tail portion of the magnetic bias layer comprises CoPtCr with nitrogen infused therein and the rest of the magnetic bias layer comprises CoPtCr.

12. The magnetic read sensor as in claim 1 wherein the tail portion of each of the magnetic bias layer has one or more of the following in fused therein: O, N, Ar, Xe, Cr, Ta, and C.

13. The magnetic read sensor as in claim 1 wherein the tail portion of each of the magnetic bias layers comprises CoPt and one or more of the following: O, N, Ar, Xe, Cr, Ta, and C.

14. The magnetic read sensor as in claim 1 wherein the tail portion of each of the magnetic bias layers comprises CoPtCr and one or more of the following: O, N, Ar, Xe, Cr, Ta, and C.

* * * * *

UNITED STATES PATENT AND TRADEMARK OFFICE
CERTIFICATE OF CORRECTION

PATENT NO. : 8,786,988 B2  
APPLICATION NO. : 13/472326  
DATED : July 22, 2014  
INVENTOR(S) : Hideki Mashima et al.

Page 1 of 1

It is certified that error appears in the above-identified patent and that said Letters Patent is hereby corrected as shown below:

In the Specification:

Column 7, line 30 replace "(ME)" with --(RIE)--.

Signed and Sealed this
Fourteenth Day of July, 2015

Michelle K. Lee
*Director of the United States Patent and Trademark Office*